(12) United States Patent
Toh et al.

(10) Patent No.: US 6,360,811 B1
(45) Date of Patent: Mar. 26, 2002

(54) HYDROGEN ABSORPTION INDIRECT HEAT EXCHANGER

(75) Inventors: Keiji Toh; Hidehito Kubo, both of Kariya; Nobuo Fujita, Toyota; Hiroyuki Mitsui, Aichi-ken, all of (JP)

(73) Assignees: Kabushiki Kaisha Toyoda Jidoshokki Seisakusho, Kariya; Toyota Jidosha Kabushiki Kaisha, Toyota, both of (JP)

(*) Notice: Subject to any disclaimer, the term of this patent is extended or adjusted under 35 U.S.C. 154(b) by 0 days.

(21) Appl. No.: 09/656,257

(22) Filed: Sep. 6, 2000

(30) Foreign Application Priority Data

Sep. 21, 1999 (JP) .......................... 11-266980

(51) Int. Cl.⁷ ................................. F28D 1/06
(52) U.S. Cl. ...................... 165/75; 165/104.12; 165/10; 165/81; 48/174; 62/46.2; 62/480; 62/477; 62/440; 220/581; 220/592.01; 220/592.28
(58) Field of Search ............................. 165/10, 104.12, 165/104.11, 902, 75, 73, 81; 48/174; 220/581, 592.26, 592.01, 592.28; 62/430, 440, 444, 46.2, 477, 480

(56) References Cited

U.S. PATENT DOCUMENTS

| | | | |
|---|---|---|---|
| 2,019,356 A | * 10/1935 | Normelli ................... 62/46.2 |
| 2,384,460 A | * 9/1945 | Kleen ....................... 62/46.2 |
| 3,489,311 A | * 1/1970 | Folkerts et al. .............. 165/10 |
| 4,133,426 A | * 1/1979 | Turillon et al. .............. 62/46.2 |
| 4,211,208 A | * 7/1980 | Lindner ..................... 165/10 |
| 4,333,516 A | * 6/1982 | Krueger et al. ......... 165/104.12 |
| 4,667,815 A | * 5/1987 | Halene ................... 220/592.28 |
| 4,723,595 A | * 2/1988 | Yasunaga et al. ...... 165/104.12 |
| 4,923,075 A | * 5/1990 | Rohl et al. ............. 220/592.26 |
| 4,928,496 A | * 5/1990 | Wallace et al. ............... 62/46.2 |
| 5,122,338 A | * 6/1992 | Wallace et al. ............... 62/46.2 |
| 5,184,669 A | * 2/1993 | Tamme et al. ......... 165/104.12 |
| 5,950,708 A | * 9/1999 | Schatz ....................... 165/10 |
| 5,975,335 A | * 11/1999 | Witenhafer ............ 220/592.28 |
| 6,257,322 B1 | * 7/2001 | Toh et al. ............. 165/104.12 |

FOREIGN PATENT DOCUMENTS

| | | |
|---|---|---|
| JP | 06 281097 | 10/1994 |
| JP | 08 191515 | 7/1996 |
| JP | 11 30397 | 2/1999 |

\* cited by examiner

*Primary Examiner*—Ira S. Lazarus
*Assistant Examiner*—Terrell McKinnon
(74) *Attorney, Agent, or Firm*—Morgan & Finnegan, LLP

(57) ABSTRACT

A case for a hydrogen absorption indirect heat exchanger of the present invention includes a square cylindrical portion 11 having each portion thereof formed integrally by die-casting or extrusion molding. The corners 11a of this square cylindrical portion 11 and the center portion of its side 11b are shaped to a greater thickness than that of other portions. The weight of the case can be reduced while the case powder capacity is secured.

6 Claims, 5 Drawing Sheets

(1/4 SECTION)

HYDROGEN ABSORPTION INDIRECT HEAT EXCHANGER

BACKGROUND OF THE INVENTION

1. Field of the Invention

This invention relates to a case of a hydrogen absorption indirect heat exchanger having an indirect heat exchanger and a hydrogen absorbing alloy powder packed therein.

2. Description of the Related Art

Japanese Unexamined Patent Publication (Kokai) No. 11-30397 filed by the applicant of the present invention discloses a hydrogen absorption indirect heat exchanger that is produced by holding hydrogen absorbing alloy powder and an indirect heat exchanger in a sealed case, and stores hydrogen gas by utilizing the hydrogen absorbing/desorbing operation of a hydrogen absorbing alloy powder.

Since the indirect heat exchanger is substantially rectangular in this hydrogen absorption indirect heat exchanger, the sealed case has a structure in which each opening of a square cylindrical portion has a predetermined thickness and a substantially rectangular section is closed by a cover plate.

In the conventional sealed case having the structure in which each opening of the square cylindrical portion is closed by the cover plate, the sealed case must have a large thickness so as to withstand the increase of an internal pressure resulting from the expansion of hydrogen absorbing alloy powder when it absorbs hydrogen. In consequence, the weight becomes large and invites a problem when the heat exchanger is mounted to a vehicle or the like.

SUMMARY OF THE INVENTION

The present invention is completed in view of the problem described above, and aims at providing a case for a hydrogen absorption indirect heat exchanger, capable of reducing the weight while securing the case powder capacity.

The case for the hydrogen absorption indirect heat exchanger according to the present invention includes a square cylindrical portion each portion of which is integrally formed by die-casting or extrusion molding, and a cover plate for covering each opening of the square cylindrical portion. The corners of the square cylindrical portion and the center portion of each side, that are stress concentration portions, are shaped to a greater thickness than the thickness of other portions. Therefore, the present invention can provide a case capable of withstanding the increase of the internal pressure without increasing the thickness of all the portions as in the prior art, and can reduce the weight while the case powder capacity is secured.

The present invention may be more fully understood from the description of a preferred embodiment set forth below, together with the accompanying drawings.

DESCRIPTION OF THE PREFERRED EMBODIMENTS

Figure 1:
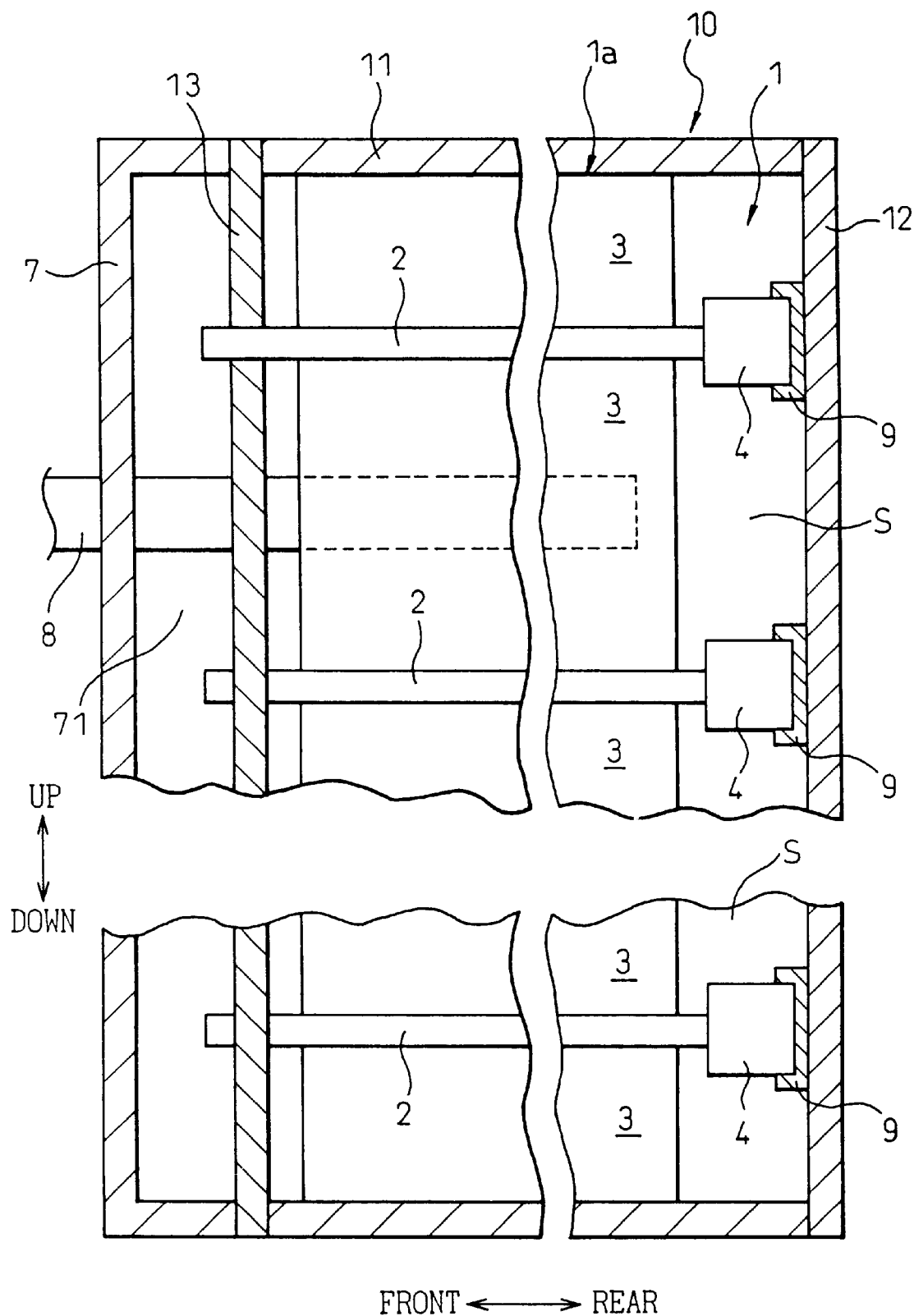
FIG. 1 is a schematic longitudinal sectional view of a hydrogen absorption indirect heat exchanger in its longitudinal direction according to an embodiment of the present invention.

A hydrogen absorption indirect heat exchanger according to an embodiment of the present invention will be explained with reference to the accompanying drawings.

The hydrogen absorption indirect heat exchanger comprises an indirect heat exchanger 1 having a heat exchanger unit 1a, a sealed case 10 and hydrogen absorbing alloy powder (solid-gas reaction powder), not shown, packed into the sealed case 10.

The indirect heat exchanger 1 includes flat tubes 2, corrugated fins 3, tubular headers 4, an upstream side heat exchanger set 5, a downstream side heat exchanger set 6, a common header 7 and a gas transportation tube 8. The upstream side heat exchanger set 5 and the downstream side heat exchanger set 6 together constitute the heat exchanger unit 1a.

The flat tube 2 includes a large number of small flow paths 20 that are formed independently and extend in a longitudinal direction while they are aligned to the right and left. The corrugated fins 3 are brazed to the upper and lower surfaces of the flat tube 2. The corrugated fin 3 includes a large number of fins that are extended in the longitudinal direction and in the vertical direction, and a louver for transversely passing hydrogen is cut in each fin.

Figure 3:
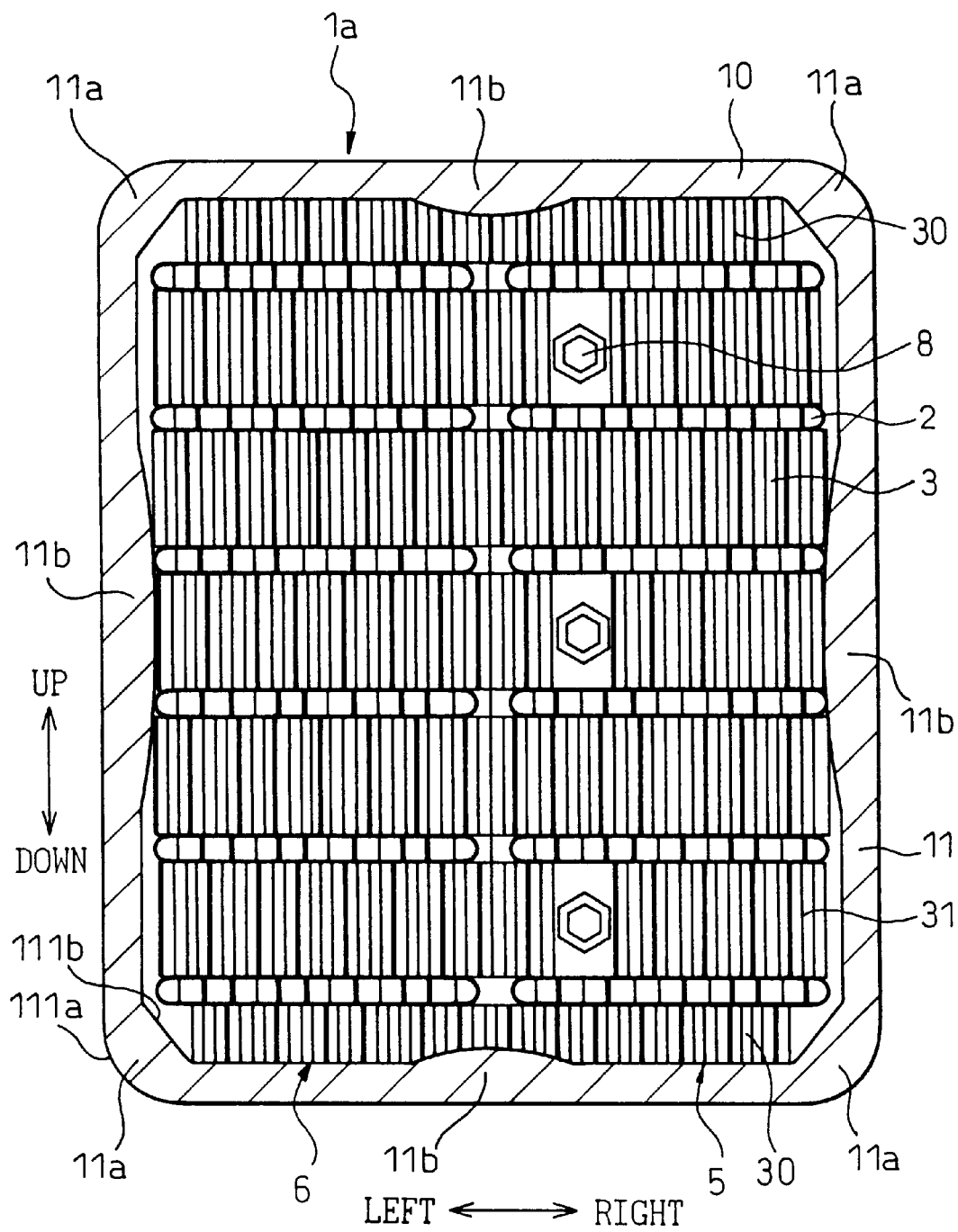
FIG. 3 is a longitudinal sectional view of a hydrogen absorption indirect heat exchanger in its transverse direction shown in FIG. 1.

As shown in FIG. 3, each of the upstream side heat exchanger set 5 and the downstream side heat exchanger set 6 comprises six flat tubes 2 and seven corrugated fins 3 that are aligned alternately in the direction of height. The downstream side heat exchanger sets 6 are disposed on the left side of the upstream side heat exchanger sets 5 with predetermined spaces between them as shown in FIG. 3. The vertical width of the corrugated fins 30 of the uppermost and lowermost stages is the half of that of the corrugated fins 31 of the intermediate stages.

Each tubular header 4 is positioned in proximity to the rear end of each flat tube 2, is extended in the width-wise direction (in the transverse direction) of the flat tube 2, and connects the rear ends of a pair of flat tubes 2 existing at a height equal to that of both heat exchanger sets 5 and 6. Therefore, six, in total, tubular heads 4 are disposed, and a predetermined space s is secured between the adjacent pair of tubular headers 4. Incidentally, the flat tubes 2 and the corrugated fins 3 of the intermediate stages are partly omitted in FIG. 2.

Figure 2:
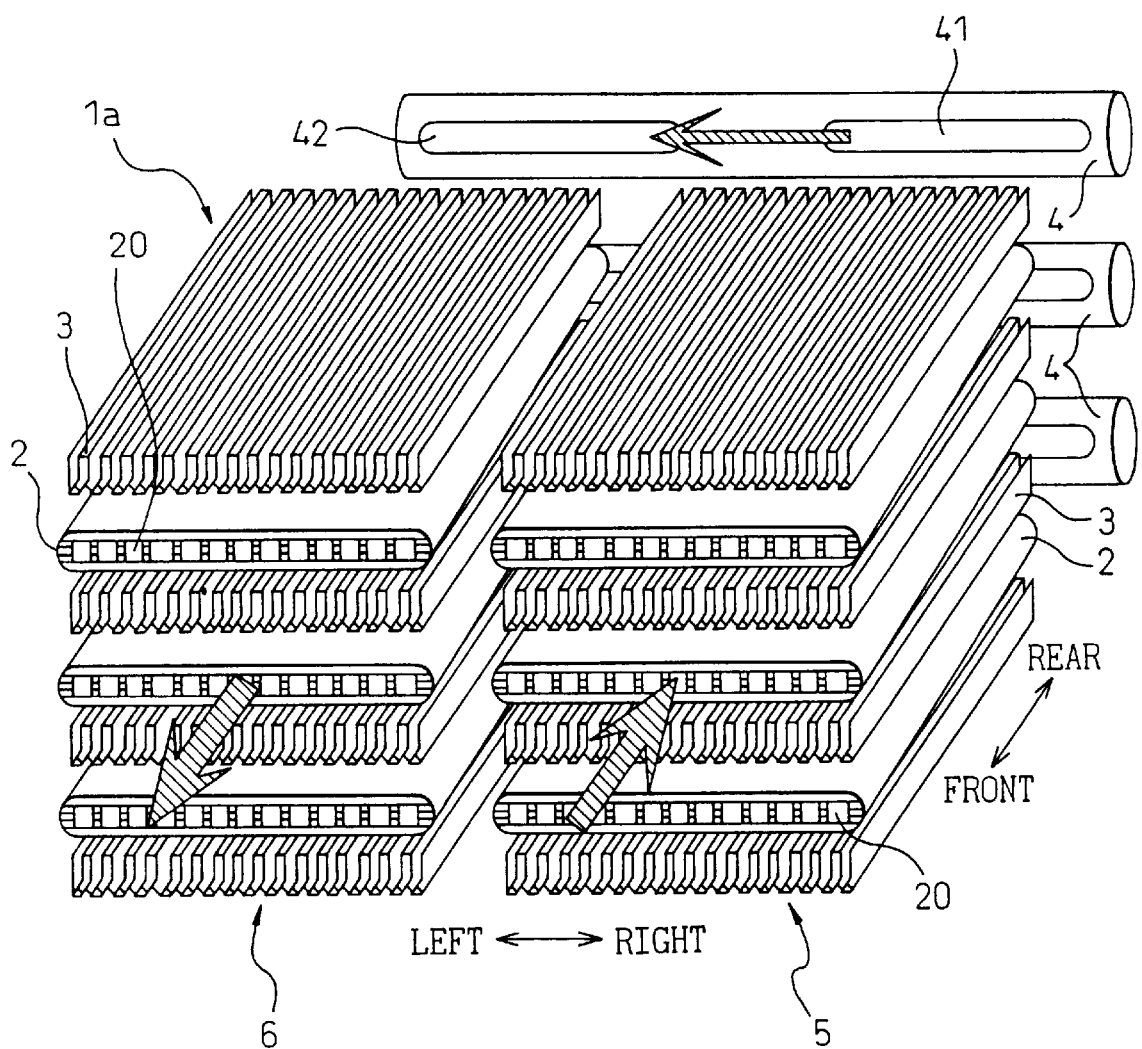
FIG. 2 is a partially exploded perspective view of a heat exchanger unit shown in FIG. 1.

An explanation will be given in greater detail. As shown in FIG. 2, each tubular header 4 is equipped on the peripheral wall thereof with an opening 41, into which the flat tube 2 of the upstream side heat exchanger 5 is fitted and brazed, and with an opening 42 into which the flat tube 2 of the downstream side heat exchanger set 6 is fitted and brazed. Plugs, not shown, seal both ends of the tubular header 4.

The sealed case 10 has nearly a square cylindrical portion 11 shaped by extrusion molding of an aluminum alloy (JIS (Japanese Industrial Standards) A-7N01, for example), a cover plate 12 for closing an opening at the rear end of the square cylindrical portion 11, welded to the rear end of the square cylindrical portion 11 by TIG welding, for example, and a cover plate 13 for closing an opening at the front end of the square cylindrical portion 11, welded at the front end of the square cylindrical portion 11.

The thickness of the square cylindrical portion 11 is different at each portion of its peripheral wall as shown in FIG. 3. In the vertical and transverse sections, the outer edges (outer peripheral edges) 111a and the inner edges (inner peripheral edges) 111b at the four corners 11a are curved at predetermined radii of curvature to form curved corners. The thickness at the corners 11a between the outer edges (outer peripheral edges) 111a and the inner edges (inner peripheral edges) 111b is larger than the minimum thickness of each side 11b of the square cylindrical portion 11, becomes maximal at the center of the corners 11a in the peripheral direction, and becomes progressively smaller from this center in the peripheral direction towards substantially flat sheet-like sides on both sides. The thickness of the four sides 11b of the square cylindrical portion 11, too, is maximal at the center of each side in the peripheral direction and becomes progressively smaller towards the corners 11a on both sides. It has been found that such an arrangement can improve the pressure resistance of the corners 11a per unit weight.

In other words, when the internal pressure increases, the center of each side 11b swells outwards with each corner 11a as a node. At this time, the greatest tensile stress acts on the center of each side 11b in the peripheral direction while the greatest compressive stress acts on each corner 11a. Therefore, when the thickness is selectively increased at the center of each corner 11a and each side 11b, the pressure resistance can be remarkably improved in comparison with an increase in the weight of the square cylindrical portion 11.

The simulation result of the optimal thickness distribution at each peripheral wall of the square cylindrical portion 11 described above will be explained further with reference to FIG. 5.

Figure 5:
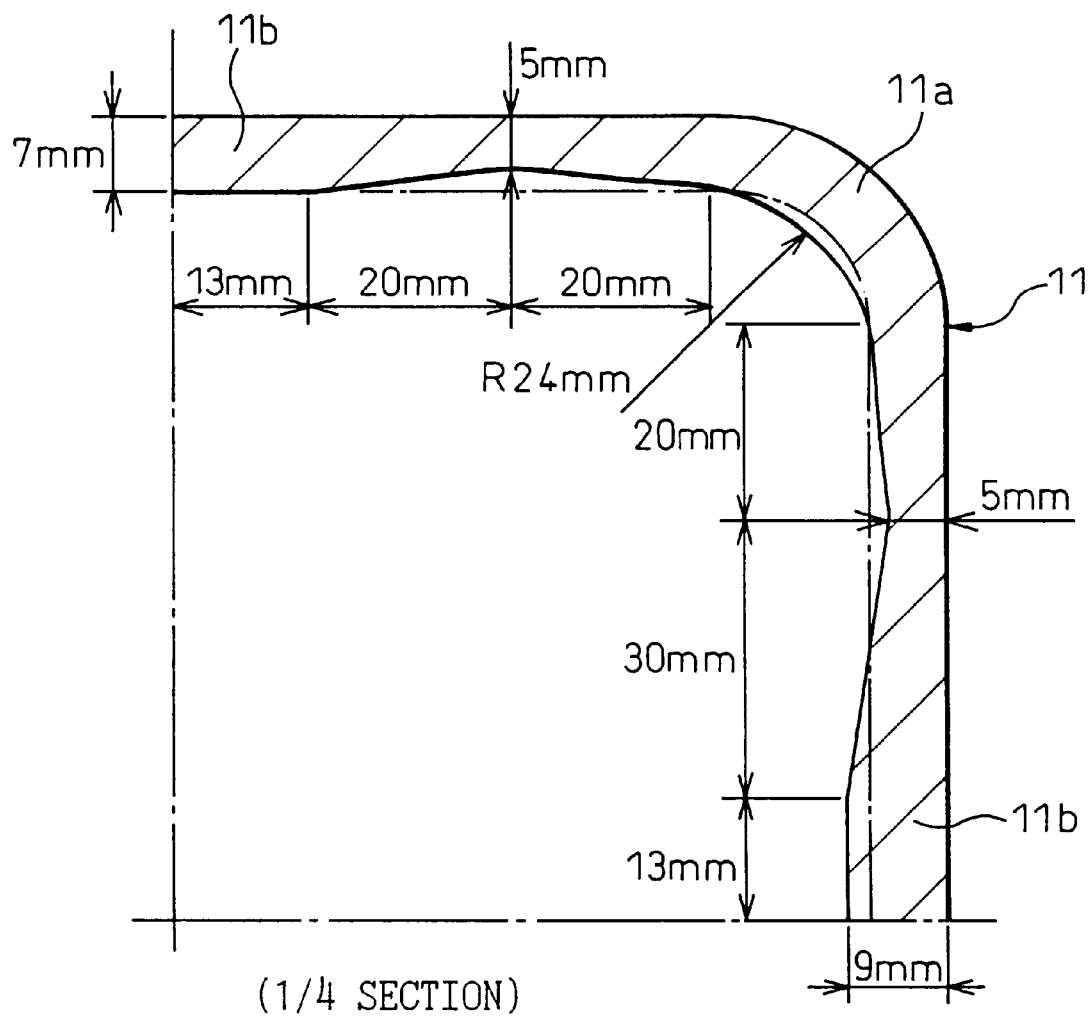
FIG. 5 is a partial enlarged vertical sectional view of a sealed case in the embodiment of the present invention.

When the sectional shape shown in FIG. 5 is employed, the maximum stress value occurring in the sealed case 10 is 9.21 kgf/mm$^2$ at a gas pressure of 10 kgf/cm$^2$ when the material is an aluminum alloy (JIS A7N01-T5). In contrast, it is 14.00 kgf/mm$^2$ when the square cylindrical portion has a constant thickness. According to the model shown in FIG. 5, therefore, pressure resistance performance can be improved by about 30% in comparison with the sectional shape having a constant thickness. Incidentally, the inner capacity of both models is assumed to be equal.

Figure 4:
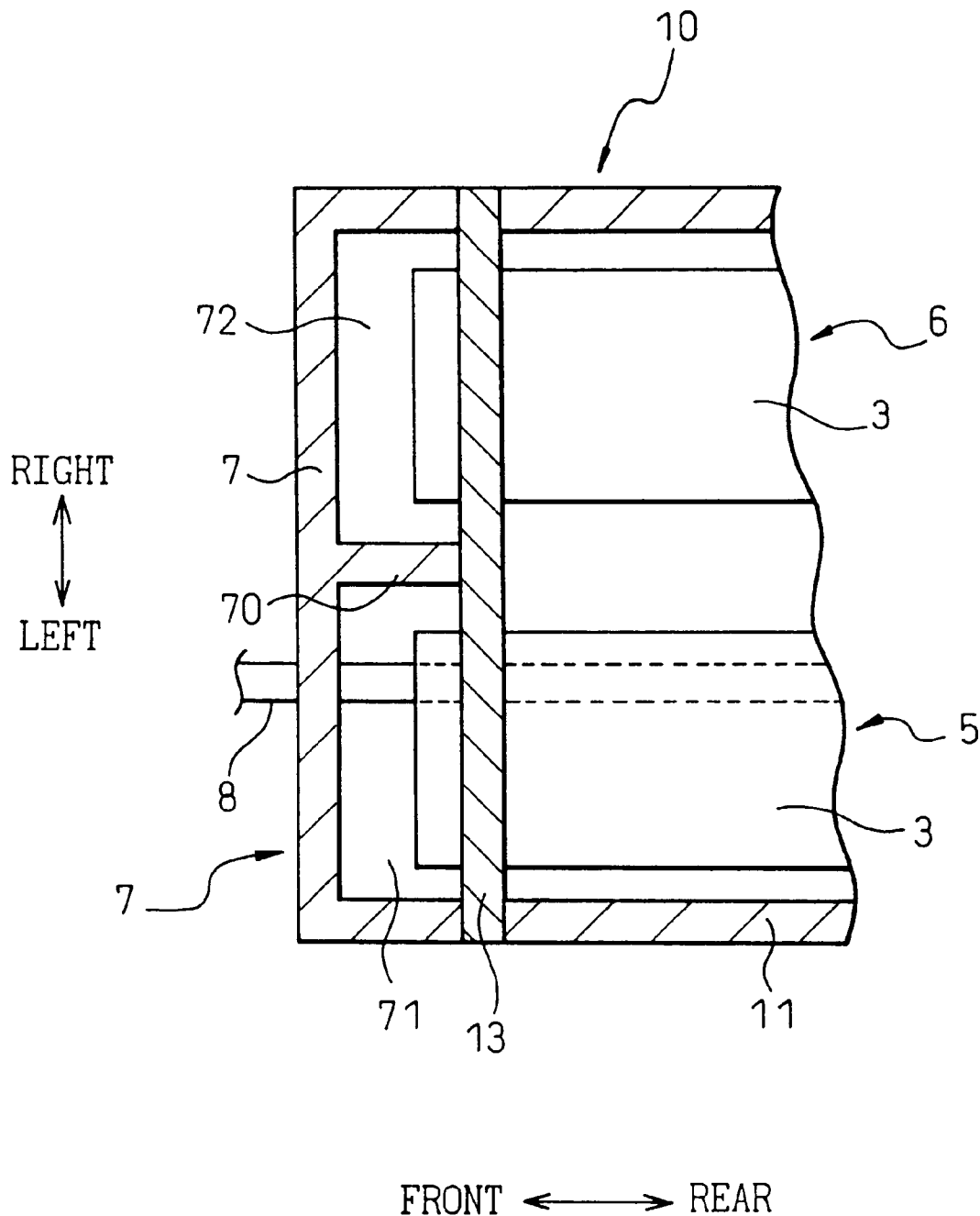
FIG. 4 is a horizontal sectional plan view of a portion in the proximity of a common header in FIG. 1.

The common header 7 comprises a shallow bottomed square can that is welded to the entire periphery of the cover plate 13 in such a manner as to cover this cover plate 13. It is made by aluminum die-casting. The common header 7 has a partition wall 70 at the center in the transverse direction as shown in FIG. 4. The partition wall 70 divides the sealed space defined by the common header 7 and the cover plate 13 into two parts in the transverse direction, and defines a sealed space forming an upstream side common header 71 and a sealed space forming a downstream side common header 72 in the present invention.

The gas transportation tube 8 is a porous ceramic filter tube that is made by a sintering broze, and is connected to an external hydrogen pipe, not shown. Reference numeral 9 denotes a clamp plate portion that vertically clamps the tubular header 4 welded to the inner surface of the cover plate 12.

The assembly process of this apparatus will be hereinafter explained.

The cover plate 13 having holes for inserting the flat tubes 2, the common header 7 and the square cylindrical portion 11 are welded to form a square can body. After the heat exchanger unit 1a is accommodated in this square can body, the distal end of each flat tube 2 is inserted through the openings 41, 42 of the tubular headers 4.

Next, the hydrogen absorbing alloy powder is added through the spaces between the tubular headers 4 and the spaces between the tubular headers 4 and the peripheral wall of the square cylindrical portion 11, and is packed between the corrugated fins 3.

The cover plate 12 is then welded by TIG welding to the square cylindrical portion 11, and the sealed case 10 is thus defined.

Incidentally, the upstream side common header 71 and the downstream side common header 72 inside the common header 7 are individually connected to a liquid heat storage medium piping arrangements through pipes, not shown, respectively.

Next, the operation will be explained.

When the hydrogen gas is transported into the sealed case 10 through the gas transportation tube 8, the hydrogen gas is absorbed by hydrogen absorbing alloy powder. The hydrogen absorbing alloy powder then undergoes exothermy, and its heat is transferred to the heat storage medium inside the flat tube 2 through the corrugated fin 3 and the flat tube 2. The heat storage medium transfers the heat from the upstream side common header 71 to the outside through the flat tube 2 of the upstream side heat exchanger set 5, the tubular head 4, the flat tube 2 of the downstream side heat exchanger set 6 and the downstream side common header 2.

When the hydrogen gas is transported to the outside of the sealed case 10 through the gas transportation tube 8, hydrogen absorbing alloy powder emits the hydrogen gas and undergoes endothermy. Heat is transferred to the heat storage medium inside the flat tube 2 via the corrugated fins 3 and the flat tube 2. Incidentally, the sealed case 10 has an internal pressure of several atmospheres during the operation, but its pressure resistance is set to a level several times this internal pressure to insure safety.

According to this construction, the transverse width of the corrugated fins 30 of the uppermost and lowermost stages among the corrugated fins 31 is smaller than that of the corrugated fins 31 of the intermediate stages in the transverse and vertical sections of the square cylindrical portion 11 as shown in FIG. 3. Therefore, the corners (also called the "curved corners") of the square cylindrical portion 11 can be curved to almost a quarter circle at a predetermined radius of curvature, and the pressure resistance of the square cylindrical portion 11 can be improved without increasing the thickness of the curved corners of the square cylindrical portion 11 and other flat sheet-like portions. As shown in FIG. 3, the hydrogen absorption indirect heat exchanger is disposed in the recessed form at the center portion facing the center of each side 11b of the square cylindrical portion 11.

In the embodiment described above, the sealed case 10 is made of aluminum alloy, but it may also be made of a stainless steel, or the like. The square cylindrical portion 11 is produced in accordance with the extrusion molding method, but it may be produced by die-casting, or the like.

The thickness may be increased locally by allowing the square cylindrical portion 11 to swell outwards.

In the embodiment described above, the thickness is locally increased into a lens-like sectional shape, but the thickness may be changed into two or more stages. The peripheral wall portion of the square cylindrical portion 11 extending in the horizontal direction shown in FIG. 3, in particular, faces the corrugated fins 3. Therefore, when the thickness is changed step-wise, the fine adjustment of the fin length of the corrugated fins 3 need not be conducted in the case where the distal end portions of the corrugated fins are brought into contact with, or close to, the peripheral portion of the square cylindrical portion 11 extending in the horizontal direction.

While the invention has been described by reference to a specific embodiment chosen for purposes of illustration, it should be apparent that numerous modifications could be made thereto by those skilled in the art without departing from the basic concept and scope of the invention.

What is claimed is:

1. A case for a hydrogen absorption indirect heat exchanger, for accommodating therein said hydrogen absorption indirect heat exchanger having heat medium piping arrangements equipped with fins and shaped into a substantially rectangular parallelopiped shape together with hydrogen absorbing alloy powder, comprising:

a square cylindrical portion and cover plates for closing openings of said square cylindrical portion;

wherein the corners of said square cylindrical portion and the center of each side thereof have a thickness greater than that of other portions.

2. A case for a hydrogen absorption indirect heat exchanger according to claim 1, wherein the thickness of the center portion of each side of said square cylindrical portion decreases progressively from the center of the side.

3. A case for a hydrogen absorption indirect heat exchanger according to claim 1, wherein the center portion of each side of said square cylindrical portion swells inward.

4. A case for a hydrogen absorption indirect heat exchanger according to claim 2, wherein the center portion of each side of said square cylindrical portion swells inward.

5. A case for a hydrogen absorption indirect heat exchanger according to claim 3, wherein said hydrogen absorption indirect heat exchanger is disposed in the recessed form at the portion facing the center portion of each side of said square cylindrical portion.

6. A case for a hydrogen absorption indirect heat exchanger according to claim 4, wherein said hydrogen absorption indirect heat exchanger is disposed in the recessed form at the portion facing the center portion of each side of said square cylindrical portion.

* * * * *